US012601942B2

(12) United States Patent
Takemoto et al.

(10) Patent No.: US 12,601,942 B2
(45) Date of Patent: Apr. 14, 2026

(54) ANTI-REFLECTIVE FILM-ATTACHED TRANSPARENT SUBSTRATE AND IMAGE DISPLAY DEVICE

(71) Applicant: AGC Inc., Tokyo (JP)

(72) Inventors: Kazuya Takemoto, Tokyo (JP); Keisuke Kawai, Tokyo (JP); Teruo Fujiwara, Tokyo (JP); Hideaki Takahoshi, Tokyo (JP)

(73) Assignee: AGC Inc., Tokyo (JP)

( * ) Notice: Subject to any disclaimer, the term of this patent is extended or adjusted under 35 U.S.C. 154(b) by 507 days.

(21) Appl. No.: 18/155,997

(22) Filed: Jan. 18, 2023

(65) Prior Publication Data

US 2023/0229037 A1 Jul. 20, 2023

(30) Foreign Application Priority Data

Jan. 19, 2022 (JP) ................................. 2022-006760
Jan. 13, 2023 (JP) ................................. 2023-003739

(51) Int. Cl.
*G02F 1/1335* (2006.01)
*C08J 5/18* (2006.01)
(Continued)

(52) U.S. Cl.
CPC .......... *G02F 1/133502* (2013.01); *C08J 5/18* (2013.01); *G02B 1/111* (2013.01);
(Continued)

(58) Field of Classification Search
CPC .. G02B 1/11; G02B 1/10; G02B 1/111; G02B 1/115; G02B 1/116; G02B 1/14;
(Continued)

(56) References Cited

U.S. PATENT DOCUMENTS

2003/0076596 A1*  4/2003  Miyatake ................. G02B 1/11
                                                             359/601
2007/0146887 A1*  6/2007  Ikeda ...................... G02B 1/111
                                                             359/586
(Continued)

FOREIGN PATENT DOCUMENTS

EP           4 186 690 A1      5/2023
JP         2008-201633 A       9/2008
(Continued)

OTHER PUBLICATIONS

English translation of WO 2022004737. (Year: 2022).*
Extended European Search Report issued Jun. 16, 2023, in corresponding European Patent Application No. 23152245.9, 9 pages.

*Primary Examiner* — Jie Lei
(74) *Attorney, Agent, or Firm* — Oblon, McClelland, Maier & Neustadt, L.L.P.

(57) ABSTRACT

An anti-reflective film-attached transparent substrate includes: a transparent substrate including two major surfaces; and a diffusion layer and an anti-reflective film on one major surface of the transparent substrate, which are provided in this order. (A) A luminous reflectance SCI Y of an outermost surface of the anti-reflective film-attached transparent substrate is 1% or lower. (B) The anti-reflective film has a lamination structure in which at least two dielectric layers having different refractive indices are laminated. (C) A ratio (SCE Y)/(SCI Y) of a diffuse reflectance SCE Y of the outermost surface of the anti-reflective film-attached transparent substrate to the luminous reflectance SCI Y of the outermost surface of the anti-reflective film-attached transparent substrate is 0.15 or higher.

20 Claims, 3 Drawing Sheets

(51) Int. Cl.
  *G02B 1/111* (2015.01)
  *G02F 1/1333* (2006.01)
  *G02B 1/18* (2015.01)
(52) U.S. Cl.
  CPC ..... *G02F 1/133331* (2021.01); *C08J 2367/02* (2013.01); *G02B 1/18* (2015.01)
(58) Field of Classification Search
  CPC .......... G02B 1/18; G02B 5/02; G02B 5/0205; G02B 5/0278; G02B 5/208; G02B 5/282; G02F 1/1333; G02F 1/1335; G02F 1/133504; G02F 1/133502; G02F 1/133331; B32B 7/023; B32B 17/10; B32B 17/08; B32B 17/10137; B32B 2457/20; C08J 5/18; C08J 2367/02
  USPC ....... 359/601, 580, 581, 586, 587, 599, 604, 359/605, 609
  See application file for complete search history.

(56) References Cited

U.S. PATENT DOCUMENTS

| | | | |
|---|---|---|---|
| 2008/0199671 | A1 | 8/2008 | Miyagi et al. |
| 2018/0038995 | A1 | 2/2018 | Fujii |
| 2018/0203354 | A1 | 7/2018 | Fujii |
| 2020/0123049 | A1 | 4/2020 | Fujii |
| 2023/0144879 | A1 | 5/2023 | Suzuki et al. |
| 2023/0150245 | A1 | 5/2023 | Takemoto et al. |

FOREIGN PATENT DOCUMENTS

| | | | |
|---|---|---|---|
| JP | | 2009-086495 | 4/2009 |
| JP | | 2016-68470 | A | 5/2016 |
| JP | | 2018-115105 | A | 7/2018 |
| WO | WO 2022/004737 | A1 | 1/2022 |
| WO | WO 2022/019243 | A1 | 1/2022 |

* cited by examiner

ANTI-REFLECTIVE FILM-ATTACHED TRANSPARENT SUBSTRATE AND IMAGE DISPLAY DEVICE

CROSS-REFERENCE TO RELATED APPLICATIONS

This application claims priority from Japanese Patent Application No. 2022-006760 filed on Jan. 19, 2022, and Japanese Patent Application No. 2023-003739 filed on Jan. 13, 2023, the entire subject matter of which is incorporated herein by reference.

TECHNICAL FIELD

The present invention relates to an anti-reflective film-attached transparent substrate and an image display device having the anti-reflective film-attached transparent substrate.

BACKGROUND ART

In recent years, for aesthetic purposes, a technique of forming a transparent substrate such as a cover glass on the front surface of an image display device such as a liquid crystal display (LCD) has been used. However, in this case, there is a glare problem that is caused by reflection of external light by the transparent substrate.

One known method for preventing glare due to the refection of external light is use of a transparent substrate having an anti-reflective film (hereinafter also referred to as an "anti-reflective film-attached transparent substrate"). For example, Patent document 1 discloses an anti-reflective film-attached transparent substrate that is light-absorptive and insulative. Patent document 2 discloses a transparent conductive laminate in which a silicon oxide layer and a copper layer are laid in order. Patent document 3 discloses an anti-reflective film in which a coating made up of a film(s) made of a high refractive index material and a film made of a low refractive index material is formed on a glass plate surface and its outermost surface is the surface of the film made of the low refractive index material.

CITATION LIST

Patent Literature

Patent document 1: JP-A-2018-115105
Patent document 2: JP-A-2016-068470
Patent document 3: JP-A-2008-201633

SUMMARY OF INVENTION

Technical Problem

However, conventional anti-reflective film-attached transparent substrates cannot suppress the reflection of external light sufficiently, that is, have room for improvement in the prevention of glare due to external light reflection.

An object of the present invention is to provide an anti-reflective film-attached transparent substrate in which glare due to external light reflection is suppressed sufficiently as well as an image display device having it.

Solution to Problem

The invention provides the following:

(1) An anti-reflective film-attached transparent substrate including a diffusion layer and an anti-reflective film that are formed in this order on one major surface of a transparent substrate having two major surfaces, in which (A) a luminous reflectance SCI Y of an outermost surface of the anti-reflective film-attached transparent substrate is 1% or lower, (B) the anti-reflective film has a lamination structure in which at least two dielectric layers having different refractive indices are laminated, and (C) a ratio (SCE Y)/(SCI Y) of a diffuse reflectance SCE Y of the outermost surface of the anti-reflective film-attached transparent substrate to the luminous reflectance SCI Y of the outermost surface of the anti-reflective film-attached transparent substrate is 0.15 or higher.

(2) The anti-reflective film-attached transparent substrate according to item (1), in which a laminate of the transparent substrate and the diffusion layer has a haze value of 10% or larger.

(3) The anti-reflective film-attached transparent substrate according to item (1) or (2), in which a luminous transmittance Y is 20% to 90%.

(4) The anti-reflective film-attached transparent substrate according to any one of items (1) to (3), in which the anti-reflective film has a sheet resistivity of $10^4 \Omega/$ square or higher.

(5) The anti-reflective film-attached transparent substrate according to any one of items (1) to (4), wherein a b* value of a transmission color with a D65 light source is 5 or smaller.

(6) The anti-reflective film-attached transparent substrate according to any one of items (1) to (5), in which at least one layer of the dielectric layers is mainly formed of an oxide of Si, a at least another layer in layers of the laminated structure is mainly formed of a mixed oxide of an oxide containing at least one element selected from the group A consisting of Mo and W and an oxide containing at least one element selected from the group B consisting of Si, Nb, Ti, Zr, Ta, Al, Sn, and In, and a content of the elements of the group B contained in the mixed oxide is 65 mass % or lower with respect to a total of the elements of the group A contained in the mixed oxide and the elements of the group B contained in the mixed oxide.

(7) The anti-reflective film-attached transparent substrate according to any one of items (1) to (6), further including an antifouling film on the anti-reflective film.

(8) The anti-reflective film-attached transparent substrate according to any one of items (1) to (7), in which the transparent substrate contains a glass.

(9) The anti-reflective film-attached transparent substrate according to any one of items (1) to (8), in which the transparent substrate contains at least one resin selected from polyethylene terephthalate, polycarbonate, acrylic, silicone, and triacetyl cellulose.

(10) The anti-reflective film-attached transparent substrate according to any one of items (1) to (9), in which the transparent substrate is a laminate of a glass and at least one resin selected from polyethylene terephthalate, polycarbonate, acrylic, silicone, and triacetyl cellulose.

(11) The anti-reflective film-attached transparent substrate according to item (8) or (10), in which the glass or glass layer is chemically strengthened.

(12) The anti-reflective film-attached transparent substrate according to any one of items (1) to (11), in which the major surface of the transparent substrate on a side where the anti-reflective film is provided is subjected to an antiglare treatment.

(13) An image display device including the anti-reflective film-attached transparent substrate according to any one of items (1) to (12).

One aspect of the invention can provide an anti-reflective film-attached transparent substrate in which glare due to external light reflection is suppressed sufficiently. Providing this feature, the anti-reflective film-attached transparent substrate according to this aspect of the invention is suitable for use as a cover glass of an image display device.

Another aspect of the invention can provide an image display device having such an anti-reflective film-attached transparent substrate.

DETAILED DESCRIPTION OF EMBODIMENT

An embodiment of the present invention will be hereinafter described in detail.

In this specification, the expression "another layer, film, or the like exists on a major surface of a substrate such as a transparent substrate, a layer such as a diffusion layer, or a film such as an anti-reflective film" is not limited to a case that the other layer, film, or the like is formed so as to be in contact with the major surface, layer, or film and may mean that the other layer, film, or the like is formed above the major surface, layer, or film. For example, the expression "a diffusion layer exists on a major surface of a transparent substrate" may mean either a case that the diffusion layer is formed so as to be in contact with the major surface of the transparent substrate or a case that another, optional layer, film, or the like is formed between the transparent substrate and the diffusion layer.

An anti-reflective film-attached transparent substrate according to the embodiment of the invention is an anti-reflective film-attached transparent substrate including a transparent substrate including two major surfaces, and a diffusion layer and an anti-reflective film on one major surface of the transparent substrate, which are provided in this order, in which (A) a luminous reflectance SCI Y of an outermost surface of the anti-reflective film-attached transparent substrate is 1% or lower, (B) the anti-reflective film has a lamination structure in which at least two dielectric layers having different refractive indices are laminated, and (C) a ratio (SCE Y)/(SCI Y) of a diffuse reflectance SCE Y of the outermost surface of the anti-reflective film-attached transparent substrate to the luminous reflectance SCI Y of the outermost surface of the anti-reflective film-attached transparent substrate is 0.15 or higher.

4

Figure 1:
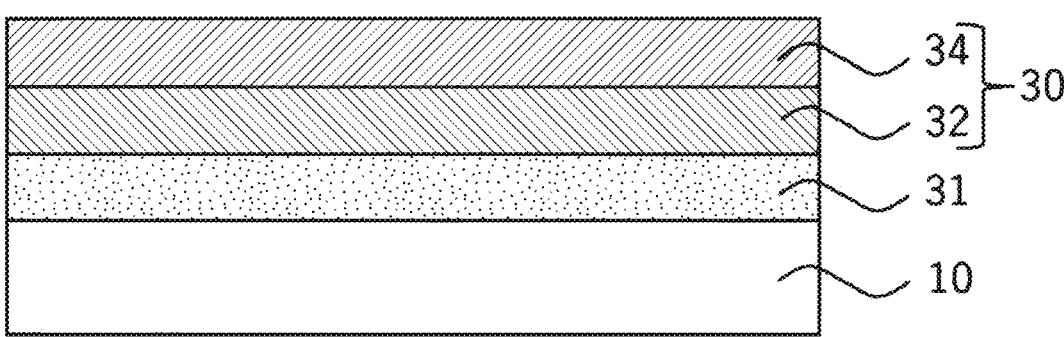
FIG. 1 is a schematic sectional view showing an example configuration of an anti-reflective film-attached transparent substrate according to an embodiment of the present invention.

FIG. 1 is a schematic sectional view showing an example configuration of an anti-reflective film-attached transparent substrate according to the embodiment of the invention. A diffusion layer 31 is formed on a transparent substrate 10 and an anti-reflective film (multilayer film) 30 is formed on the diffusion layer 31.

<Transparent Substrate>

In the embodiment, it is preferable that the refractive index of the transparent substrate having two major surfaces (hereinafter simply referred to as a "transparent substrate") be 1.4 or larger and 1.7 or smaller. Where the refractive index of the transparent substrate is in this range, when it is bonded optically to a display or a touch panel the reflection at the bonding surface can be made sufficiently small. It is even preferable that the refractive index be 1.45 or larger, even preferably 1.47 or larger. And it is preferable that the refractive index be 1.65 or smaller, even preferably 1.6 or smaller.

It is preferable that the transparent substrate contain at least one of glass and resin, even preferably both of glass and resin.

When the transparent substrate contains a glass, the high surface flatness of glass allows for a clean, high-quality image when placed on the display surface.

When the transparent substrate contains a resin, it is more resistant to breakage due to external impact and is safer than the glass. In the case where a transparent film such as PET or TAC is selected as the resin, continuous processing using a roll is possible as a method of forming the diffusion layer as an antiglare treatment, which reduces the cost. Furthermore, the application of fine particles of various materials as the diffusion layer has the advantage of allowing greater flexibility in the design of the diffusion layer compared to the method of etching the glass surface.

When the transparent substrate contains both glass and resin, for example, by laminating a resin film in which a diffusion layer is formed to the glass to prepare the transparent substrate containing both glass and resin, advantages such as the flatness of glass, and the shatterproof function and the diffusion layer with a high degree of design freedom of the resin can be provided.

Where the transparent substrate contain glass, there are no particular limitations on the kind of the glass; kinds of glass having various compositions may be used. Among various kinds of glass, glass containing sodium is preferable and glass having such a composition as to be able to be reinforced by chemical strengthening treatment is also preferable. Specific examples include aluminosilicate glass, soda-lime glass, borosilicate glass, lead glass, alkali barium glass, and aluminoborosilicate glass.

In this specification, the transparent substrate is also referred to as a glass substrate in the case where it contains glass.

There are no particular limitations on the thickness of the glass substrate. However, where the glass is to be subjected to chemical strengthening treatment, to perform chemical strengthening effectively, it is preferable that the thickness of the glass substrate be 5 mm or smaller, even preferably 3 mm or smaller and further preferably 1.5 mm or smaller. Usually, the thickness of the glass substrate is 0.2 mm or larger.

It is preferable that the glass substrate be a chemically strengthened glass. An anti-reflective film-attached transparent substrate using it is increased in strength. Where antiglare treatment (described later) is to be performed on the glass substrate, chemical strengthening is performed after the antiglare treatment before formation of an anti-reflective film (multilayer film).

It is preferable that antiglare treatment be performed on the anti-reflective film-side major surface of the glass substrate. This enhances the antiglare performance of the transparent substrate, whereby a clear image can be observed through the transparent substrate.

Where the transparent substrate contains resin, there are no particular limitations on the resin type; resins having various compositions can be used. Preferable resins are thermoplastic resins and thermosetting resins, among which are a polyvinyl chloride resin, a polyethylene resin, a polypropylene resin, a polystyrene resin, a polyvinyl acetate resin, a polyester resin, a polyurethane resin, a cellulose-based resin, an acrylic resin, an AS (acrylonitrile-styrene) resin, an ABS (acrylonitrile-butadiene-styrene) resin, a fluorine-based resin, thermoplastic elastomer, a polyamide resin, a polyimide resin, a polyacetal resin, a polycarbonate resin, a modified polyphenylene ether resin, a polyethylene terephthalate resin, a polybutylene terephthalate resin, a polylactic acid-based resin, a cyclic polyolefin resin, and a polyphenylene sulfide resin. Among these examples, a cellulose-based resin such as a triacetyl cellulose resin, a polycarbonate resin, and a polyethylene terephthalate resin are even preferable. One kind among these resins may be used singly or two or more kinds among them may be used in combination.

It is particularly preferable that the above-mentioned resin include at least one resin selected from polyethylene terephthalate, polycarbonate, acrylic, silicone, and triacetyl cellulose. These resins are preferred because they are colorless and transparent, high transmittance, low scattering, relatively inexpensive due to their high availability, and can provide functions as the main component in the hard coating and the adhesive.

In this specification, the transparent substrate is also referred to as a resin substrate in the case where it contains resin.

It is preferable that the resin substrate have a film shape. Where the resin substrate has a film shape, that is, it is a resin film, there are no particular limitations on its thickness but it is preferable that its thickness be 20 to 150 μm, even preferably 40 to 80 μm.

Where transparent substrate contains both of glass and resin, it may be in such a form that a resin substrate as mentioned above is formed on a glass substrate as mentioned above.

The diffusion layer (described later) is formed on one major surface of the transparent substrate, and examples of a laminate having (a part of) the transparent substrate and the diffusion layer (hereinafter also referred to simply as a "laminate") include a resin substrate-antiglare layer laminate and a glass substrate-antiglare layer laminate.

Specific examples of the resin substrate-antiglare layer laminate include an antiglare PET film and an antiglare TAC film. Examples of the antiglare PET film include ones having product names "BHC-III" and "EHC-30a" produced by Higashiyama Film Co., Ltd. and one produced by Reiko Co., Ltd. Examples of the antiglare TAC film include ones having product names "VZ50" and "VH66H" produced by Toppan TOMOEGAWA Optical Film Co, Ltd.

The glass substrate-antiglare layer laminate is obtained by applying an antiglare treatment to the major surface of the glass substrate on the side with the anti-reflective film, as described below, to provide an antiglare layer.

It is preferable that the haze value of the laminate be 10% or larger, even preferably 15% or larger, further preferably 20% or larger, furthermore preferably 25% or larger, and especially preferably 50% or larger. In the case where the haze value of the laminate is in the above range, glare due to external light reflection can be suppressed more effectively. It is preferable that the haze value of the laminate be 90% or lower, even preferably 85% or lower, and further preferably 82% or lower. In the case where the haze value of the laminate is in the above range, decrease in display resolution can be reduced and whitening of images when ambient light enters the display.

The haze value is measured using, for example, a haze meter (type name: HR-100, produced by Murakami Color Research Laboratory) according to JIS K 7136 (2000).

It is preferable that Sa (arithmetic average surface roughness) of the laminate be 0.05 to 0.6 μm, even preferably 0.05 to 0.55 μm. Sa is prescribed in ISO25178 and can be measured using, for example, a laser microscope "VK-X3000" produced by Keyence Corporation. A small Sa means that the surface asperity of the transparent substrate is small. The diffuse reflectance (SCE Y) becomes small due to the low diffusivity of reflected light, making it difficult to obtain the reflection suppression effect. A large Sa means that the surface asperity of the transparent substrate is large. Although the diffuse reflectance increases, surface stains are difficult to remove, making it undesirable as a display surface material. Sa can be adjusted by appropriately changing parameters such as the type, average particle diameter, and mixing amount of fine particles used as diffusion material, appropriately controlling etching conditions of surface treatment, and appropriately curing and forming unbalanced diffusion layers such as sol-gel silica.

It is preferable that the developed area ratio Sdr (hereinafter also referred to simply as "Sdr") of the laminate as measured from a surface area obtained by a measurement using, for example, the laser microscope "VK-X3000" produced by Keyence Corporation be 0.001 to 0.12, even preferably 0.0025 to 0.11.

The developed area ratio Sdr is prescribed in ISO25178 and given by the following formula:

$$(\text{developed area ratio } Sdr) = \{(A-B)/B\}$$

A: a surface area (developed surface aera) that reflects actual asperities in a measurement region; and B: an area of a flat surface with no asperities in the measurement region.

A small Sdr means that the surface area of the transparent substrate is small. When the surface area is relatively low, the diffusivity of reflected light becomes low and the diffuse reflectance (SCE Y) becomes small, making it difficult to obtain the reflection suppression effect. A large Sdr means that the surface area of the transparent substrate is large. Since the area of the antireflection layer in contact with the outside air relatively increases, there is a higher concern that the reliability of the antireflection film decreases. Sdr can be adjusted by appropriately changing parameters such as the type, average particle diameter, and mixing amount of fine particles used as diffusion material, appropriately controlling etching conditions of surface treatment, and appropriately curing and forming unbalanced diffusion layers such as sol-gel silica.

It is preferable that the root mean square slope Sdq of the laminate be 0.03 to 0.50, even preferably 0.07 to 0.49. The root mean square slope Sdq is prescribed in ISO25178 and can be measured using, for example, the laser microscope "VK-X3000" produced by Keyence Corporation. A small Sdq means that the root-mean-square slope is small. When diffusivity of reflected light is low, diffuse reflectance (SCE Y) becomes low, making it difficult to obtain reflection suppression effect. When Sdq is large, the root-mean-square slope increases and the sharpness of the outermost surface of the transparent substrate increases, resulting in a scratchy feel when touched with a finger or cloth, which deteriorates the tactile sensation. Sdq can be adjusted by appropriately changing parameters such as the type, average particle diameter, and mixing amount of fine particles used as diffusion material, appropriately controlling etching conditions of surface treatment, and appropriately curing and forming unbalanced diffusion layers such as sol-gel silica.

It is preferable that Spc (an average of principal curvatures of peaks of a surface) be 150 to 2,500 (1/mm). Spc is prescribed in ISO25178 and can be measured using, for example, the laser microscope "VK-X3000" produced by Keyence Corporation. When Spc is small, the arithmetic mean curvature of the peak point becomes small and the diffuse reflectance (SCE Y) of the outermost surface of the transparent substrate becomes small, making it difficult to obtain reflection suppression effect. When Spc is large, the arithmetic mean curvature of the peak point becomes large, which causes a scratchy feel when touched with a finger or cloth, which deteriorates the tactile sensation. Spc can be adjusted by appropriately changing parameters such as the type, average particle diameter, and mixing amount of fine particles used as diffusion material, appropriately controlling etching conditions of surface treatment, and appropriately curing and forming unbalanced diffusion layers such as sol-gel silica.

<Diffusion Layer>

In the embodiment, the diffusion layer is formed on one major surface of the transparent substrate. The diffusion layer means a layer having a function of reducing dazzle and glare due to external light reflection by diffusing specular reflection light and is, for example, an antiglare layer in which a hard coat layer is given a function of diffusing specular reflection light (antiglareness).

The antiglare layer imparts antiglareness by increasing the haze value because one surface of the antiglare layer has asperities and causes scattering of light. The antiglare layer is made of an antiglare layer composition obtained by dispersing at least a particulate substance that provides antiglareness by itself in a solution in which polymeric resin (binder) is dissolved. The antiglare layer can be formed by applying the antiglare layer composition on, for example, one major surface of the transparent substrate.

Examples of the particulate substance that provides antiglareness include inorganic fine particles such as silica, clay, talc, calcium carbonate, calcium sulfate, barium sulfate, aluminum silicate, titanium oxide, synthetic zeolite, alumina, and smectite and organic fine particles such as a styrene resin, a urethane resin, a benzoguanamine resin, a silicone resin, and an acrylic resin.

For example, a polymeric resin containing a polyester resin, an acrylic resin, an acrylic urethane resin, a polyester acrylate resin, a polyurethane acrylate resin, an epoxy acrylate resin, a urethane resin, or the like can be used as a polymeric resin as the binder for the hard coat layer or the antiglare layer.

In the case where the transparent substrate is a glass substrate, the glass substrate may have a diffusion layer on one of the major surfaces of the glass substrate by applying an antiglare treatment to the major surface on the side with the antireflection film. This enhances the antiglare property of the transparent substrate and makes images observed through the transparent substrate clearer.

There are no particular limitations on the method of the antiglare treatment. An example method is a method of forming desired asperities on a major surface of the glass substrate by performing surface treatment on it.

Specific examples are a method of performing chemical treatment, e.g., frost treatment, on a major surface of the glass substrate. In example frost treatment, a glass substrate as a body to be treated is immersed in a mixed solution of hydrogen fluoride and ammonium fluoride, whereby the immersed surface is surface-treated chemically.

Example usable methods other than chemical treatment such as frost treatment are physical treatment methods such as what is called sandblast of blowing crystalline silicon dioxide powder, silicon carbide powder, or the like over the surface of a glass substrate using pressurized air and treatment of rubbing up the surface of a glass substrate with a brush that is water-wetted and on which crystalline silicon dioxide powder, silicon carbide powder, or the like is stuck.

<Anti-Reflective Film>

The anti-reflective film employed in the embodiment has a lamination structure that at least two dielectric layers having different refractive indices are laminated on each other and provides a function of suppressing the reflection of light.

The anti-reflective film (multilayer film) 30 shown in FIG. 1 has a lamination structure that two layers, that is, a first dielectric layer 32 and a second dielectric layer 34 having different refractive indices, are laminated on each other. The reflection of light is suppressed by laminating the first dielectric layer 32 and the second dielectric layer 34 having different refractive indices on each other. The first dielectric layer 32 is a high refractive index layer and the second dielectric layer 34 is a low refractive index layer.

In the anti-reflective film (multilayer film) 30 shown in FIG. 1, it is preferable that the first dielectric layer 32 be mainly formed of a mixed oxide of an oxide containing at least one element selected from the A group consisting of Mo and W and an oxide containing at least one element selected from the B group consisting of Si, Nb, Ti, Zr, Ta, Al, Sn, and In. It is preferable that the content of the elements of the B group in the mixed oxide be 65 mass % or lower with respect to the sum of the content of the elements of the A group in the mixed oxide and the content of the elements of the B group in the mixed oxide (hereinafter referred to as a B group content ratio). The term "mainly" as used above means that the component concerned is a component whose content (in terms of mass) is highest, e.g., 70 mass % or higher, in the first dielectric layer 32.

A phenomenon that transmission light becomes yellowish can be suppressed in the case where the B group content ratio of the first dielectric layer (A-B-O) 32 which is formed of a mixed oxide of an oxide containing at least one element selected from the A group consisting of Mo and W and an oxide containing at least one element selected from the B group consisting of Si, Nb, Ti, Zr, Ta, Al, Sn, and In is 65 mass % or lower.

It is preferable that the second dielectric layer 34 be mainly formed of an oxide of Si ($SiO_x$). The term "mainly" as used here means that the component concerned is a component whose content (in terms of mass) is highest, e.g., 70 mass % or higher, in the second dielectric layer 34.

It is preferable that the first dielectric layer 32 be formed of a mixed oxide of an oxide containing at least one element selected from the A group consisting of Mo and W and an oxide containing at least one element selected from the B group consisting of Si, Nb, Ti, Zr, Ta, Al, Sn, and In. It is preferable that Mo be selected from the A group and Nb be selected from the B group.

The composition that the second dielectric layer 34 is formed of an oxygen-deficient silicon oxide layer and the first dielectric layer 32 is formed of Mo and Nb is preferable because by virtue of the use of Mo and Nb the oxygen-deficient silicon oxide layer does not make visible light yellowish in contrast to the fact that an oxygen-deficient silicon oxide layer usually makes visible light yellowish.

It is preferable that the refractive index of the first dielectric layer 32 at a wavelength 550 nm be 1.8 to 2.3 from the viewpoint of transmittance that is obtained when it is combined with the transparent substrate 10.

It is preferable that the extinction coefficient of the first dielectric layer 32 be 0.005 to 3, even preferably 0.04 to 0.38. Where the extinction coefficient is 0.005 or larger, a desired absorptance value can be obtained with a proper number of layers. Where extinction coefficient is 3 or smaller, a desired reflection color and transmittance value can both be realized relatively easily.

Although the anti-reflective film (multilayer film) 30 shown in FIG. 1 has a lamination structure consisting of two layers in total, that is, the first dielectric layer 32 and the second dielectric layer 34, the structure of the anti-reflective film (multilayer film) employed in the embodiment is not limited to it and may have a lamination structure consisting of three or more dielectric layers that are different from each other in refractive index. In this case, it is not necessary that all the dielectric layers are different from each other in refractive index. For example, a lamination structure of three layers may consist of a low refractive index layer, a high refractive index layer, and a low refractive index layer or of a high refractive index layer, a low refractive index layer, and a high refractive index layer. In the former case, the two low refractive index layers may have the same refractive index. In the latter case, the two high refractive index layers may have the same refractive index.

A lamination structure of four layers may consist of a low refractive index layer, a high refractive index layer, a low refractive index layer, and a high refractive index layer or of a high refractive index layer, a low refractive index layer, a high refractive index layer, and a low refractive index layer. In each of these cases, the two low refractive index layers may have the same refractive index and the two high refractive index layers may have the same refractive index.

A lamination structure of three or more layers having different refractive indices may include a dielectric layer that is neither the first dielectric layer (A-B-O) 32 nor the second dielectric layer (SiO$_x$) 34. In this case, the layers are selected so as to include the first dielectric layer (A-B-O) 32 and the second dielectric layer (SiO$_x$) 34 and have a three-layer laminated structure consisting of a low refractive index layer, a high refractive index layer, and a low refractive index layer, a three-layer laminated structure consisting of a high refractive index layer, a low refractive index layer, and a high refractive index layer, a four-layer laminated structure consisting of a low refractive index layer, a high refractive index layer, a low refractive index layer, and a high refractive index layer or of a four-layer laminated structure consisting of a high refractive index layer, a low refractive index layer, a high refractive index layer, and a low refractive index layer.

It is preferable that the outermost layer be the second dielectric layer (SiO$_x$) 34. Low reflectance can be obtained relatively easily by employing the second dielectric layer (SiO$_x$) 34 as the outermost layer. Where the anti-reflective film 30 is to be formed with an antifouling layer (described later), it is preferable that the antifouling layer be formed on the second dielectric layer (SiO$_x$) 34 from the viewpoint of connectivity that relates to the durability of the antifouling layer.

It is preferable that the first dielectric layer (A-B-O) 32 be amorphous. An amorphous first dielectric layer (A-B-O) 32 can be formed at a relatively low temperature and hence this structure can be applied satisfactorily to, for example, a case that the transparent substrate 10 contains resin because the resin is prevented from being damaged by heat.

A halftone mask that is used in the field of semiconductor manufacture is known as a light-transparent film that is capable of light absorption and insulative. An oxygen-deficient film such as an Mo—SiO$_x$ film that contains Mo a little is used as the halftone mask. Also known as a light-transparent film that is capable of light absorption and insulative is a narrow band gap film that is used in the field of semiconductor manufacture.

However, these light-transparent films produce yellowish transmission light because they are high in visible light absorptance on the short wavelength side. Thus, they are not suitable for use in a cover glass of an image display device.

In the preferred embodiment of the invention in which the first dielectric layer 32 is increased in the content of Mo and W and the second dielectric layer 34 is formed of SiO$_x$ etc., an anti-reflective film-attached transparent substrate can be obtained that is capable of light absorption, insulative, and high in adhesion and strength.

The anti-reflective film 30 employed in the embodiment can be formed on a major surface of the transparent substrate 10 by a known film forming method such as sputtering, vacuum evaporation, or application. That is, dielectric layers to constitute the anti-reflective film 30 are formed on a major surface of the diffusion layer 31 in their lamination order by a known film forming method such as sputtering, vacuum evaporation, or application. The antireflection film 30 may be formed on the major surface of the transparent substrate by combining multiple deposition methods. For example, the antireflection film 30 can be formed by sputtering, and only the outermost antifouling film can be formed by vapor deposition or coating, or layers other than the outermost layer of the antireflection film 30 can be formed by sputtering, and only the outermost layer can be formed by an organic film with antifouling properties.

The antireflection film 30 is preferably formed by a method of layering thin films in a vacuum, such as sputtering or vacuum evaporation, from the viewpoints of low reflection, high durability, and high hardness. According to such in-vacuum layering method, the surface hardness is superior to that of the wet coating method in which the coating liquid is cured and dried to form the antireflection film, the effect of low reflection is higher, the SCI Y value can be stably reduced to 1% or less, and the in-plane reflectance distribution is also appropriate.

Example sputtering methods are magnetron sputtering, pulse sputtering, AC sputtering, and digital sputtering.

For example, the magnetron sputtering is a method of forming a several nanometers-thick sputtering film by generating a magnetic field by installing a magnet on the back surface side of a base dielectric material and causing gas ions to collide with the surface of the dielectric material and kicking out constituent particles. With this method, a dielectric continuous film that is made of an oxide or nitride of the dielectric material can be formed.

For example, the digital sputtering is different from ordinary magnetron sputtering in that a metal oxide thin film is formed by repeating, in the same chamber, a step of forming an extremely thin metal film first by sputtering and then oxidizing the extremely thin metal film by irradiation with oxygen plasma, oxygen ions, or oxygen radicals. In this case, higher ductility would be obtained than in a case of metal oxide deposition because film forming molecules constitute a metal when they are deposited on the substrate. Thus, rearrangement of film forming molecules would occur more easily even with the same energy, resulting in formation of a dense and smooth film.

<Antifouling Film>

From the viewpoint of protecting the outermost surface of the anti-reflective film, the anti-reflective film-attached transparent substrate according to the embodiment may further has an antifouling film (also referred to as an "anti-finger print (AFP) film") on the anti-reflective film. For example, the antifouling film can be formed by a fluorine-containing organic silicon compound. There are no particular limitations on the kind of the fluorine-containing organic silicon compound except that it should exhibit antifoulingness, water repellency, and oil repellency. Examples of the fluorine-containing organic silicon compound include one having one or more groups selected from the group consisting of a polyfluoro polyether group, a polyfluoroalkylene group, and a polyfluoroalkyl group. The polyfluoro polyether group is a divalent group having a structure that polyfluoroalkylene groups and ethereal oxygen atoms are bonded to each other so as to be arranged alternately.

Preferable examples of a fluorine-containing organic silicon compound on the market having one or more groups selected from the group consisting of a polyfluoro polyether group, a polyfluoroalkylene group, and a polyfluoroalkyl group include KP-801, KY178, KY-130, and KY-185 (product names, produced by Shin-Etsu Chemical Co., Ltd.) and Optool (registered trademark) DSX and Optool AES (product names, produced by Daikin Industries, Ltd.).

Where the anti-reflective film-attached transparent substrate according to the embodiment has an antifouling film, the antifouling film is formed on the anti-reflective film. Where the anti-reflective film is formed on the sides of both major surfaces of the transparent substrate, the antifouling film can be formed on both of the anti-reflective films. Alternatively, the antifouling film may be laminated only on the side of one major surface of the transparent substrate because it suffices to form the antifouling film at a position (s) where contact with a human finger etc. may occur. Whether the antifouling film should be formed on the side of one or both major surfaces can be selected according to a use etc.

(Luminous Reflectance SCI Y)

In the anti-reflective film-attached transparent substrate according to the embodiment, the luminous reflectance (SCI Y) of the outermost surface is 1% or lower. Where the luminous reflectance (SCI Y) is in this range, the anti-reflective film-attached transparent substrate is high in the effect of preventing glare due to external light reflection by the screen when it is used as a cover glass of an image display device. It is preferable that the luminous reflectance (SCI Y) be 0.9% or lower, even preferably 0.8% or lower, and further preferably 0.75% or lower.

As described later in Inventive Examples, luminous reflectance (SCI Y) can be measured by a method that is prescribed in JIS Z 8722 (2009). More specifically, luminous reflectance (SCI Y) is measured in a state that back surface reflection is prevented by, for example, sticking a black tape to the major surface (hereinafter also referred to as a back surface of the transparent substrate or merely a back surface) that is not the anti-reflective film-side major surface between the two major surfaces of the transparent substrate. The light source must be specified for the calculation of SCI Y, and the D65 light source is preferably used for the calculation because the present invention is designed to suppress reflections in daylight in bright locations.

In the anti-reflective film-attached transparent substrate according to the embodiment, the luminous reflectance (SCI Y) is made 1% or lower by, for example, making the luminous transmittance (Y) of the anti-reflective film-attached transparent substrate 90% or lower. To this end, it is preferable to adjust the amount of oxidation of the film mainly using, as the first dielectric layer, a mixed oxide of an oxide containing at least one element selected from the A group consisting of Mo and W and an oxide containing at least one element selected from the B group consisting of Si, Nb, Ti, Zr, Ta, Al, Sn, and In. By adjusting the amount of oxidation and making the antireflection film absorb, diffuse reflection from diffusion layers, etc. formed on the transparent substrate can be suppressed.

(Diffuse Reflectance SCE Y)

In the anti-reflective film-attached transparent substrate according to the embodiment, it is preferable that the diffuse reflectance (SCE Y) of the outermost surface be 0.05% or higher, even preferably 0.1% or higher and further preferably 0.2% or higher. Using, as a cover glass of an image display device, the anti-reflective film-attached transparent substrate in which the diffuse reflectance (SCE Y) of the outermost surface of the anti-reflective film is in the above range is preferable because the effect of preventing glare due to external light reflection by the screen is enhanced.

As described later in the Inventive Examples, a diffuse reflectance (SCE Y) is measured by a method that is prescribed in JIS Z 8722 (2009) using a spectrophotometer (product name: CM-26d, produced by KONICA MINOLTA, INC.).

More specifically, a diffuse reflectance (SCE Y) of the outermost surface of the anti-reflective film-attached transparent substrate is measured in a state that back surface reflection is prevented by sticking a black tape to the major surface (hereinafter also referred to as a back surface of the transparent substrate or merely a back surface) that is not the anti-reflective film-side major surface between the two major surfaces of the transparent substrate. The black tape that contains substantially no diffuse reflection component must be used. The presence or absence of diffuse reflection component can be evaluated by attaching the black tape whose diffuse reflection component is to be evaluated to a transparent object with almost zero diffuse reflection component, such as float glass, and measuring SCE Y which is the diffuse reflection component from the glass surface. Here, a black tape with substantially no diffuse reflection component means that SCE Y is 0.02% or lower by the measurement method described above. The light source must be specified for the calculation of SCE Y, and the D65 light source is preferably used for the calculation because the present invention is designed to suppress reflections in daylight in bright locations.

In other words, in the anti-reflective film-attached transparent substrate of this embodiment, the diffuse reflectance (SCE Y) of the outermost surface is measured by sticking a black tape containing substantially no diffuse reflectance components to the major surface that is not the anti-reflective film-side major surface between the two major surfaces of the transparent substrate, and using a spectrophotometer with a method specified in JIS Z 8722 (2009).

In evaluating the reflectance of the outermost surface of the anti-reflective film-attached transparent substrate, the black material used to eliminate backside reflection is a very important factor. The black material must adhere to the major surface to eliminate the interface between the air and the major surface, and a black tape or a black paint is commonly used. In order to accurately evaluate the diffuse reflectance of the outermost surface, it is necessary to use a black material with almost no diffuse reflectance component. For example, when using a black tape, the black vinyl tape (product name: 117) produced by 3M Company is not suitable for this evaluation because it has a diffuse reflectance component equivalent to about 0.7% in SCE Y with a D65 light source. On the other hand, the black tape (product name: Kukkiri Mieru) produced by TOMOEGAWA Co., Ltd. contains substantially no diffuse reflection component (the diffuse reflection component corresponds to approximately 0.01% in SCE Y with a D65 light source), and is preferably used for the measurement with the back surface reflection removed, as in this case.

As for black paint, it is common to print a black light-shielding film on the back of the front cover of a display for the purpose of hiding the wiring around the periphery of the screen from viewers, and examples of the black paint include a black paint produced by Teikoku Printing Ink Mfg. Co., Ltd. and a black paint produced by Jujo Chemical Co., Ltd. Such black light-shielding films for displays are often polyester-based inks mixed with black pigment from the viewpoint of lightfastness, but they have a diffuse reflectance of 0.2% to 0.3% derived from the pigment, and they are unsuitable for evaluations for this case where the ratio of diffuse reflectance on the outermost surface of the anti-reflective film-attached transparent substrate is important.

In the anti-reflective film-attached transparent substrate according to the embodiment, the diffuse reflectance (SCE Y) is made 0.05% or higher by making the haze value of the diffusion layer such as an antiglare layer or the laminate of the transparent substrate and the diffusion layer preferably 10% or larger, more preferably 25% or larger, and further preferably 50% or larger.

((Diffuse Reflectance SCE Y)/(Luminous Reflectance SCI Y))

In the anti-reflective film-attached transparent substrate according to the embodiment, it is important that the ratio (SCE Y)/(SCI Y) of the diffuse reflectance (SCE Y) of the outermost surface of the anti-reflective film-attached transparent substrate to the luminous reflectance (SCI Y) of the outermost surface of the anti-reflective film-attached transparent substrate be 0.15 or higher.

Since the luminous reflectance (SCI Y) is obtained by measuring and calculating all reflection light including specular reflection light and diffuse reflection light, it serves for evaluation of a color of the material itself that is irrelevant to the surface state of the anti-reflective film-attached transparent substrate. On the other hand, since the diffuse reflectance (SCE Y) is obtained by measuring and calculating only diffuse reflection light that is obtained by removing specular reflection light from all reflection light, it serves for evaluation of a color that is close to a visually recognized color.

Thus, a high ratio of the diffuse reflectance (SCE Y) to the luminous reflectance (SCI Y) is preferable because it means that the proportion of diffuse reflection light with respect to all reflection light (specular reflection light plus diffuse reflection light) is large and hence the degree of glare due to the reflection of external light by the screen is low.

It is preferable that (SCE Y)/(SCI Y) be 0.2 or higher, even preferably 0.25 or higher, more preferably 0.3 or higher, even more preferably 0.35 or higher, further preferably 0.4 or higher, further more preferably 0.45 or higher, still more preferably 0.5 or higher, and especially preferably 0.6 or higher. On the other hand, for example, (SCE Y)/(SCI Y) may be 1 or lower, and 0.75 or lower.

In the anti-reflective film-attached transparent substrate according to the embodiment, in order to make (SCE Y)/(SCI Y) 0.15 or higher, for example, it is preferable to use a laminate of the transparent substrate and the diffusion layer whose haze value is 10% or larger, more preferable to use a laminate of the transparent substrate and the diffusion layer whose haze value is 25% or larger, and further preferable to use a laminate of the transparent substrate and the diffusion layer whose haze value is 50% or larger.

(Luminous Transmittance Y)

In the anti-reflective film-attached transparent substrate according to the embodiment, it is preferable that the luminous transmittance Y be 20% to 90%. Where the luminous transmittance Y is in this range, since the anti-reflective film-attached transparent substrate has proper light absorptance, the reflection of light can be suppressed when it is used as a cover glass of an image display device. The image display device is thereby increased in bright room contrast. It is even preferable that the luminous transmittance Y be 50% to 90%, further preferably 60% to 90%.

The luminous transmittance Y may be 88% or lower, 80% or lower, 75% or lower, or 70% or lower, and the luminous transmittance Y may be 30% or higher, and 40% or higher.

As described later in the Inventive Examples, a luminous transmittance Y can be measured by a method that is prescribed in JIS Z 8701 (1999).

In the anti-reflective film-attached transparent substrate according to the embodiment, to make the luminous transmittance Y to fall within the range of 20% to 90%, it is preferable to adjust the amount of oxidation of the film mainly using, as the first dielectric layer, a mixed oxide of an oxide containing at least one element selected from the A group consisting of Mo and W and an oxide containing at least one element selected from the B group consisting of Si, Nb, Ti, Zr, Ta, Al, Sn, and In.

The luminous transmittance Y of the anti-reflective film-attached transparent substrate according to the embodiment can be adjusted by, for example, controlling the deposition time and deposition output of an oxidation source, its distance from the substrate, and the oxidation gas rate in forming the first dielectric layer which is a high refractive index layer.

(Sheet Resistivity)

In the anti-reflective film-attached transparent substrate according to the embodiment, it is preferable that the sheet resistivity of the anti-reflective film be $10^4 \Omega$/square or higher. Where the sheet resistivity of the anti-reflective film is in this range, the anti-reflective film is insulative. Thus, when the anti-reflective film-attached transparent substrate is used as a cover glass of an image display device, even if a capacitance-type touch panel is attached to it, a capacitance change caused by contact of a finger that is necessary for a capacitance-type touch sensor is maintained to allow the touch panel to function properly. It is even preferable that the sheet resistivity be $10^6$ $\Omega$/square or higher, further preferably $10^8$ $\Omega$/square or higher.

As described later in the Inventive Examples, sheet resistivity can be measured by a method that is prescribed in JIS K 6911 (2006).

In the anti-reflective film-attached transparent substrate according to the embodiment, the sheet resistivity of the anti-reflective film is made $10^4$ Ω/square or higher by, for example, adjusting the metal content in the anti-reflective film.

(b* Value of Transmission Color with D65 Light Source)

In the anti-reflective film-attached transparent substrate according to the embodiment, it is preferable that the b* value of a transmission color with a D65 light source be 5 or smaller. Where the b* value is in this range, since transmission light is not yellowish, the anti-reflective film-attached transparent substrate is suitable for use as a cover glass of an image display device. It is even preferable that the b* value be 3 or smaller, further preferably 2 or smaller. On the other hand, it is preferable that the b* value be −6 or larger, even preferably −4 or larger. The b* value being in this range is preferable because transmission light becomes colorless, that is, the transmission light is not impaired.

As described later in the Inventive Examples, a b* value of a transmission color with a D65 light source can be measured by a method that is prescribed in JIS Z 8729 (2004).

In the anti-reflective film-attached transparent substrate according to the embodiment, the b* value of a transmission color with a D65 light source is made 5 or smaller by, for example, adjusting the material composition of the first dielectric layer. Specifically, by increasing the ratio of the above group A, the transmittance at short wavelength increases and the b* value is expected to decrease.

(Lightness SCE L* of Diffuse Reflection Light)

In the anti-reflective film-attached transparent substrate according to the embodiment, it is preferable that the lightness (SCE L*) of diffuse reflection light be 7 or lower. When the anti-reflective film-attached transparent substrate is used as a cover glass of an image display device, the lightness (SCE L*) of diffuse reflection light being in this range is preferable because the effect of preventing glare due to the reflection of external light by the screen is enhanced. It is even preferable that the lightness (SCE L*) of diffuse reflection light be 6 or lower, further preferably 5 or lower.

As described later in the Inventive Examples, lightness (SCE L*) of diffuse reflection light can be measured by a method that is prescribed in JIS Z 8722 (2009) using a spectrophotometer (product name: CM-26d, produced by KONICA MINOLTA, INC.). More specifically, lightness (SCE L*) of diffuse reflection light can be measured in a state that back surface reflection is prevented by, for example, sticking a black tape to the major surface (hereinafter also referred to as a back surface of the transparent substrate or merely a back surface) that is not the anti-reflective film-side major surface between the two major surfaces of the transparent substrate.

In the anti-reflective film-attached transparent substrate according to the embodiment, the lightness (SCE L*) of diffuse reflection light can be made 7 or lower by, for example, decreasing the haze value of the diffusion layer such as an antiglare layer or the laminate of the transparent substrate and the diffusion layer.

(Lightness SCI L* of all Reflection Light)

In the anti-reflective film-attached transparent substrate according to the embodiment, it is preferable that the lightness (SCI L*) of all reflection light be 9 or lower. When the anti-reflective film-attached transparent substrate is used as a cover glass of an image display device, the lightness (SCI L*) of all reflection light being in this range is preferable because the effect of preventing glare due to the reflection of external light by the screen is enhanced. It is even preferable that the lightness (SCI L*) of all reflection light be 8 or lower, further preferably 6 or lower.

As described later in the Inventive Examples, lightness (SCI L*) of all reflection light can be measured by a method that is prescribed in JIS Z 8722 (2009) using a spectrophotometer (product name: CM-26d, produced by KONICA MINOLTA, INC.). More specifically, lightness (SCI L*) of all reflection light can be measured in a state that back surface reflection is prevented by, for example, sticking a black tape to the major surface (hereinafter also referred to as a back surface of the transparent substrate or merely a back surface) that is not the anti-reflective film-side major surface between the two major surfaces of the transparent substrate.

In the anti-reflective film-attached transparent substrate according to the embodiment, the lightness (SCI L*) of all reflection light can be made 9 or lower by, for example, decreasing the haze value of the diffusion layer such as an antiglare layer or the laminate of the transparent substrate and the diffusion layer or making the luminous transmittance Y of the anti-reflective film-attached transparent substrate 90% or lower.

(Uses)

The anti-reflective film-attached transparent substrate according to the embodiment is suitable for use as a cover glass of an image display device, in particular, a cover glass of an image display device installed in a vehicle or the like such as a a cover glass of an image display device of a navigation system installed in a vehicle or the like. The anti-reflective film-attached transparent substrate according to the embodiment is less likely to reflect structures or persons in the company illuminated by the sun or other external light on the screen, and especially when both glass and resin are included as the transparent substrate, both improvement of display quality and shatterproof performance can be expected. It is noted that liquid crystal displays (LCDs) that are high in heat resistance and durability are employed as image display devices of navigation systems installed in vehicles etc. The anti-reflective film-attached transparent substrate according to the embodiment is also suitable as a surface material for large-screen image display devices because of its property of making it difficult for surrounding objects to be reflected in the display. In addition to liquid crystal displays, LED displays with high brightness and organic EL displays with high brightness contrast are used for such image display devices.

(Image Display Device)

An image display device according to an embodiment of the invention is equipped with the above-described anti-reflective film-attached transparent substrate. One mode of implementation of the image display device is an image display device in which the anti-reflective film-attached transparent substrate is provided on a liquid crystal display (LCD), an LED display, an organic EL display, and the like.

EXAMPLES

Although the invention will be described below in a specific manner using Inventive Examples, the invention is not limited to them. Examples 1 to 10 are Inventive Examples and Examples 11 to 15 are Comparative Examples.

Example 1

An anti-reflective film-attached transparent substrate was produced by forming a diffusion layer and an anti-reflective film were in this order on one major surface of a transparent substrate. As described later, the transparent substrate was in a form that a resin substrate was provided on a glass substrate.

Figure 2A:
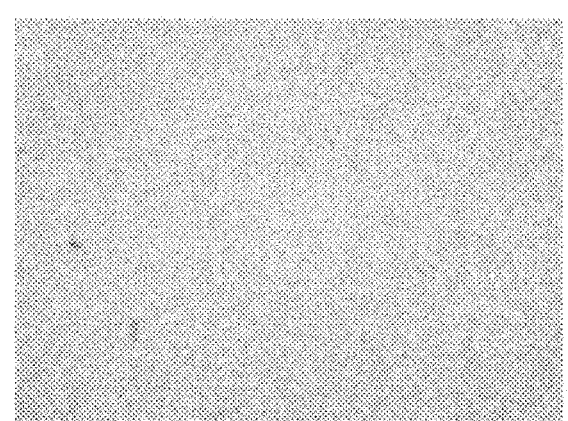
FIG. 2A to FIG. 2D are laser microscope photographs showing surface shapes of antiglare PET films that were used in part of Inventive Examples.
Figure 2B:
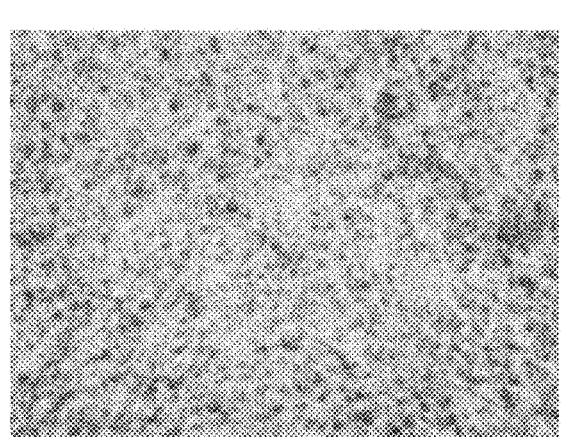
Figure 2C:
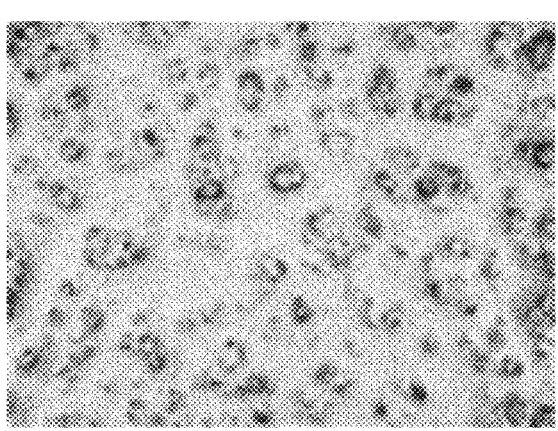
Figure 2D:
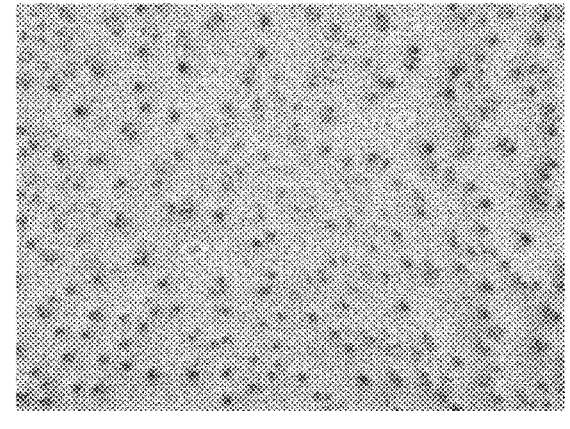
Figure 3A:
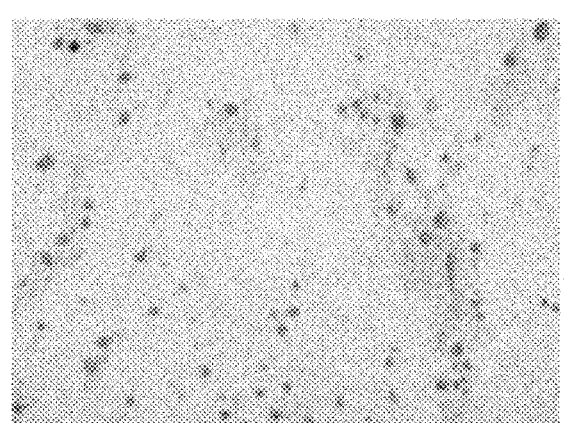
FIG. 3A to FIG. 3D are laser microscope photographs showing surface shapes of antiglare PET films and antiglare TAC films that were used in part of the Comparative Examples.
Figure 3B:
Figure 3C:
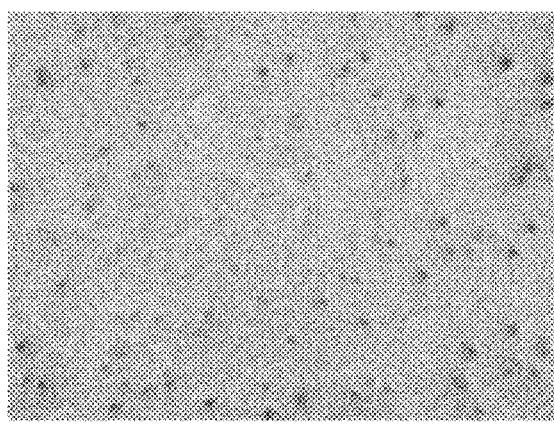
Figure 3D:
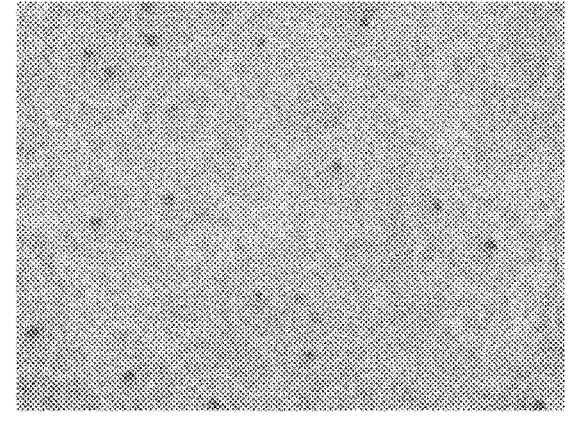

A diffusion layer was formed on the transparent substrate by sticking, as a laminate (resin film plus antiglare layer), an antiglare PET film (produced by Reiko Co., Ltd., Sa: 0.274 μm, Sdr: 0.1083, Sdq: 0.48, Spc: 1931/mm, haze value: 79%) to one major surface of a chemically strengthened glass substrate ("Dragontrail" (registered trademark), produced by AGC Inc.) measuring 50 mm (vertical)×50 mm (horizontal)×1.1 mm (thickness) with an acrylic transparent adhesive. FIG. 2A is a photograph taken by a laser microscope "VK-X3000" produced by Keyence Corporation and showing a surface shape of the above antiglare PET film.

Subsequently, a 20 nm-thick Mo—Nb—O layer was formed as a dielectric layer (1) (high refractive index layer) on the diffusion layer-stuck major surface of the transparent substrate by forming an oxide film by repeating, at a high rate, a step of forming a very thin metal film by performing pulse sputtering (digital sputtering) under conditions of a frequency 100 kHz, a power density 10.0 W/cm$^2$, and an inverting pulse width 3 μsec while keeping the pressure of argon gas at 0.2 Pa using a target obtained by mixing niobium and molybdenum at a weight ratio 50:50 and sintering the mixture and a step of oxidizing the metal film immediately thereafter using oxygen gas.

Then a 30 nm-thick layer made of silicon oxide (silica (SiO$_x$)) was formed as a dielectric layer (2) (low refractive index layer) on the above Mo—Nb—O layer by forming a silicon oxide film by repeating, at a high rate, a step of forming a very thin silicon film by performing pulse sputtering (same digital sputtering) under conditions of a frequency 100 kHz, a power density 10.0 W/cm$^2$, and an inverting pulse width 3 μsec while keeping the pressure of argon gas at 0.2 Pa using a silicon target and a step of oxidizing the silicon film immediately thereafter using oxygen gas. The oxygen flow rate during the oxidation by oxygen gas was 500 sccm and the input power of an oxidation source was 1,000 W.

A 120 nm-thick Mo—Nb—O layer was thereafter formed as a dielectric layer (3) (high refractive index layer) on the above silicon oxide layer by forming an oxide film by repeating, at a high rate, a step of forming a very thin metal film by performing pulse sputtering (same digital sputtering) under conditions of a frequency 100 kHz, a power density 10.0 W/cm$^2$, and an inverting pulse width 3 μsec while keeping the pressure of argon gas at 0.2 Pa using a target obtained by mixing niobium and molybdenum at a weight ratio 50:50 and sintering the mixture and a step of oxidizing the metal film immediately thereafter using oxygen gas.

Finally, an 88 nm-thick layer made of silicon oxide (silica (SiO$_x$)) was formed as a dielectric layer (4) (low refractive index layer) on the above Mo—Nb—O layer by forming a silicon oxide film by repeating, at a high rate, a step of forming a very thin silicon film by performing pulse sputtering (same digital sputtering) under conditions of a frequency 100 kHz, a power density 10.0 W/cm$^2$, and an inverting pulse width 3 μsec while keeping the pressure of argon gas at 0.2 Pa using a silicon target and a step of oxidizing the silicon film immediately thereafter using oxygen gas. The oxygen flow rate during the oxidation by oxygen gas was 500 sccm and the input power of an oxidation source was 1,000 W.

In the above-described manner, an antireflection film was formed on the diffusion layer, and KY-185 produced by Shin-Etsu Chemical Co., Ltd. was vacuum-deposited with thickness of 4 nm as an antifouling film as an outer most layer, whereby an anti-reflective film-attached transparent substrate was obtained.

The thus-produced anti-reflective film-attached transparent substrate was evaluated in the following manners.

(Luminous Transmittance Y)

Luminous transmittance Y of the thus-produced anti-reflective film-attached transparent substrate was measured by a method prescribed in JIS Z 8701 (1999). Spectral transmittance was measured by a spectrophotometer (product name: SolidSpec-3700, produced by Shimadzu Corporation) and luminous transmittance (a stimulus value Y prescribed in JIS Z 8701 (1999)) was determined by a calculation. A D65 light source was used for the calculation of the stimulus value Y.

(Luminous Reflectance SCI Y)

Luminous reflectance (SCI Y) of the outermost surface of the thus-produced anti-reflective film-attached transparent substrate was measured by a method prescribed in JIS Z 8722 (2009). More specifically, luminous reflectance (SCI Y) of all reflection light was measured by a spectrophotometer (product name: CM-26d, produced by KONICA MINOLTA, INC.) in a state that back surface reflection was prevented by sticking a black tape to the major surface that was not the anti-reflective film-side major surface between the two major surfaces of the transparent substrate. The light source was a D65 light source. Kukkiri Mieru produced by TOMOEGAWA Co., Ltd. was used as a black tape.

(Lightness SCI L* of all Reflection Light)

Lightness (SCI L*) of all reflection light of the thus-produced anti-reflective film-attached transparent substrate was measured by a method prescribed in JIS Z 8722 (2009). More specifically, lightness (SCI L*) of all reflection light was measured by a spectrophotometer (product name: CM-26d, produced by KONICA MINOLTA, INC.) in a state that back surface reflection was prevented by sticking a black tape to the major surface that was not the anti-reflective film-side major surface between the two major surfaces of the transparent substrate. The light source was a D65 light source. Kukkiri Mieru produced by TOMOEGAWA Co., Ltd. was used as a black tape.

(Diffuse Reflectance SCE Y)

Diffuse reflectance (SCE Y) of the outermost surface of the thus-produced anti-reflective film-attached transparent substrate was measured by a method prescribed in JIS Z 8722 (2009). More specifically, diffuse reflectance (SCE Y) was measured by a spectrophotometer (product name: CM-26d, produced by KONICA MINOLTA, INC.) in a state that back surface reflection was prevented by sticking a black tape to the major surface that was not the anti-reflective film-side major surface between the two major surfaces of the transparent substrate. The light source was a D65 light source. Kukkiri Mieru produced by TOMOEGAWA Co., Ltd. was used as a black tape. Kukkiri Mieru has a diffuse reflectance of about 0.01% in terms of SCE Y value with a D65 light source and contains substantially no diffuse reflectance component.

(Lightness SCE L* of Diffuse Reflection Light)

Lightness (SCE L*) of diffuse reflection light of the thus-produced anti-reflective film-attached transparent substrate was measured by a method prescribed in JIS Z 8722 (2009). More specifically, lightness (SCE L*) of diffuse reflection light was measured by a spectrophotometer (product name: CM-26d, produced by KONICA MINOLTA, INC.) in a state that back surface reflection was prevented by sticking a black tape to the major surface that was not the anti-reflective film-side major surface between the two major surfaces of the transparent substrate. The light source was a D65 light source. Kukkiri Mieru produced by TOMOEGAWA Co., Ltd. was used as a black tape.

(Transmission Color (b* Value) of Anti-Reflective Film-Attached Transparent Substrate with D65 Light Source)

A color indicator (b* value) prescribed in JIS Z 8729 (2004) was determined from a transmission spectrum obtained by the measuring spectral transmittance. The light source was a D65 light source.

(Sheet Resistivity of Anti-Reflective Film)

A sheet resistivity value was measured according to JIS K 6911 (2006) using a measuring instrument (instrument name: Hiresta-UP (MCP-HT450 type), produced by Mitsubishi Chemica Analytech Co., Ltd.). A measurement was performing by putting a probe to the anti-reflective film-attached transparent substrate at its center and causing energization at 10 V for 10 sec.

(Scratch Resistance Test)

A rubbing test was conducted to evaluate abrasion resistance. The anti-reflective film-attached transparent substrate was subjected to a rubbing test using a No. 3 gold cloth soaked in ethanol and a load of 1 kg/cm² for 1,000 rounds. The surface of the anti-reflective film-attached transparent substrate was then visually observed for scratches. As a control example, a sample with no antireflection film and with the antiglare layer as the outermost surface was also subjected to the same test.

Example 2

An anti-reflective film-attached transparent substrate of Example 2 was obtained by forming films in the same manner as in Example 1 except that the laminate (resin film plus antiglare layer) was replaced by an antiglare PET film (produced by Reiko Co., Ltd.) whose physical properties are shown in Table 1. Evaluation results are shown in Table 2.

Example 3

An anti-reflective film-attached transparent substrate of Example 3 was obtained by forming films in the same manner as in Example 1 except that the laminate (resin film plus antiglare layer) was replaced by an antiglare PET film (product name: BHC-III, produced by Higashiyama Film Co., Ltd.) whose physical properties are shown in Table 1. Evaluation results are shown in Table 2.

Example 4

An anti-reflective film-attached transparent substrate of Example 4 was obtained by forming films in the same manner as in Example 1 except that the laminate (resin film plus antiglare layer) was replaced by an antiglare PET film (product name: EHC-30a, produced by Higashiyama Film Co., Ltd.) whose physical properties are shown in Table 1 and the oxygen flow rate that was employed in oxidizing the first dielectric layer by oxygen gas was changed from 500 sccm to 800 sccm. Evaluation results are shown in Table 2.

Example 5

An anti-reflective film-attached transparent substrate of Example 5 was obtained by forming films in the same manner as in Example 1 except that the laminate (resin film plus antiglare layer) was replaced by an antiglare PET film (product name: EHC-30a, produced by Higashiyama Film Co., Ltd.) whose physical properties are shown in Table 1. Evaluation results are shown in Table 2.

Example 6

An anti-reflective film-attached transparent substrate of Example 6 was obtained by forming films in the same manner as in Example 1 except that the laminate (resin film plus antiglare layer) was replaced by an antiglare PET film (product name: EHC-30a, produced by Higashiyama Film Co., Ltd.) whose physical properties are shown in Table 1 and the input power of the oxidation source that was used in forming the first dielectric layer was changed to 700 W. Evaluation results are shown in Table 2.

Example 7

An anti-reflective film-attached transparent substrate of Example 7 was obtained by forming films in the same manner as in Example 1 except that the laminate (resin film plus antiglare layer) was replaced by an antiglare PET film (produced by Reiko Co., Ltd.) whose physical properties are shown in Table 1 and the oxygen flow rate that was employed in oxidizing the first dielectric layer by oxygen gas was changed to 800 sccm. Evaluation results are shown in Table 2.

Example 8

An anti-reflective film-attached transparent substrate of Example 8 was obtained by forming films in the same manner as in Example 1 except that the laminate (resin film plus antiglare layer) was replaced by an antiglare PET film (produced by Reiko Co., Ltd.) whose physical properties are shown in Table 1. Evaluation results are shown in Table 2.

Example 9

An anti-reflective film-attached transparent substrate of Example 9 was obtained by forming films in the same manner as in Example 1 except that the laminate (resin film plus antiglare layer) was replaced by an antiglare PET film (produced by Reiko Co., Ltd.) whose physical properties are shown in Table 1 and the input power of the oxidation source that was used in forming the first dielectric layer was changed to 700 W. Evaluation results are shown in Table 2.

Example 10

An anti-reflective film-attached transparent substrate of Example 10 was obtained by forming films in the same manner as in Example 1 except that the laminate (resin film plus antiglare layer) was replaced by an antiglare TAC film (product name: VZ50, produced by Toppan TOMOEGAWA Optical Film Co, Ltd.) whose physical properties are shown in Table 1. Evaluation results are shown in Table 2.

Example 11

An anti-reflective film-attached transparent substrate of Example 11 was obtained by forming films in the same manner as in Example 1 except that the laminate (resin film plus antiglare layer) was replaced by an antiglare TAC film (product name: CHC, produced by Toppan TOMOEGAWA Optical Film Co, Ltd.) whose physical properties are shown in Table 1. Evaluation Results are Shown in Table 2.

Example 12

An anti-reflective film-attached transparent substrate of Example 12 was obtained by forming films in the same manner as in Example 1 except that the laminate (resin film plus antiglare layer) was replaced by an antiglare PET film (product name: EHC-10a, produced by Higashiyama Film Co., Ltd.) whose physical properties are shown in Table 1 and the input power of the oxidation source that was used in forming the first dielectric layer was changed to 700 W. Evaluation results are shown in Table 2.

Example 13

An anti-reflective film-attached transparent substrate of Example 13 was obtained by forming films in the same manner as in Example 1 except that the laminate (resin film plus antiglare layer) was replaced by an antiglare PET film (product name: EHC-05a, produced by Higashiyama Film Co., Ltd.) whose physical properties are shown in Table 1 and the input power of the oxidation source that was used in forming the first dielectric layer was changed to 700 W. Evaluation results are shown in Table 2.

Example 14

An anti-reflective film-attached transparent substrate of Example 14 was obtained by forming films in the same manner as in Example 1 except that the laminate (resin film plus antiglare layer) was replaced by an antiglare PET film (product name: EHC-30a, produced by Higashiyama Film Co., Ltd.) whose physical properties are shown in Table 1 and the anti-reflective film was replaced by a transparent anti-reflective film formed by a method described below. (Method for Forming a Transparent Anti-Reflective Film)

First, an 11 nm-thick Ti—O layer was formed as a dielectric layer (1) (high refractive index layer) on the diffusion layer-stuck major surface of the transparent substrate by forming an oxide film by repeating, at a high rate, a step of forming a very thin metal film by performing pulse sputtering (digital sputtering) under conditions of a frequency 100 kHz, a power density 10.0 W/cm$^2$, and an inverting pulse width 3 μsec while keeping the pressure of argon gas at 0.2 Pa using a titanium target and a step of oxidizing the metal film immediately thereafter using oxygen gas.

Then a 35 nm-thick layer made of silicon oxide (silica (SiO$_x$)) was formed as a dielectric layer (2) (low refractive index layer) on the above Ti—O layer by forming a silicon oxide film by repeating, at a high rate, a step of forming a very thin silicon film by performing pulse sputtering (same digital sputtering) under conditions of a frequency 100 kHz, a power density 10.0 W/cm$^2$, and an inverting pulse width 3 μsec while keeping the pressure of argon gas at 0.2 Pa using a silicon target and a step of oxidizing the silicon film immediately thereafter using oxygen gas. The oxygen flow rate during the oxidation by oxygen gas was 500 sccm and the input power of an oxidation source was 1,000 W.

A 104 nm-thick Ti—O layer was thereafter formed as a dielectric layer (3) (high refractive index layer) on the above silicon oxide layer by forming an oxide film by repeating, at a high rate, a step of forming a very thin metal film by performing pulse sputtering (same digital sputtering) under conditions of a frequency 100 kHz, a power density 10.0 W/cm$^2$, and an inverting pulse width 3 μsec while keeping the pressure of argon gas at 0.2 Pa using a titanium target and a step of oxidizing the metal film immediately thereafter using oxygen gas.

Finally, an 86 nm-thick layer made of silicon oxide (silica (SiO$_x$)) was formed as a dielectric layer (4) (low refractive index layer) on the above Ti—O layer by forming a silicon oxide film by repeating, at a high rate, a step of forming a very thin silicon film by performing pulse sputtering (same digital sputtering) under conditions of a frequency 100 kHz, a power density 10.0 W/cm$^2$, and an inverting pulse width 3 μsec while keeping the pressure of argon gas at 0.2 Pa using a silicon target and a step of oxidizing the silicon film immediately thereafter using oxygen gas. The oxygen flow rate during the oxidation by oxygen gas was 500 sccm and the input power of an oxidation source was 1,000 W. Evaluation results are shown in Table 2.

Example 15

An anti-reflective film-attached transparent substrate of Example 15 was obtained by forming films in the same manner as in Example 1 except that the laminate (resin film plus antiglare layer) was replaced by one (produced by Reiko Co., Ltd.) whose physical properties are shown in Table 1 and the anti-reflective film was replaced by the same transparent anti-reflective film as used in Example 14. Evaluation results are shown in Table 2.

TABLE 1

| | Transparent substrate | | Diffusion layer | | | | | | Anti-reflective film | | | |
| | | | | | | | | | Dielectric layer (1) | Dielectric layer (2) | Dielectric layer (3) | Dielectric layer (4) |
| | | | Laminate | | | | | | High refractive index layer | Low refractive index layer | High refractive index layer | Low refractive index layer |
| | Glass substrate | Resin substrate | Anti-glare layer | Sa (μm) | Sdr | Sdq | Spc (/mm) | FIG. | Haze value (%) | | | | |
| Ex. 1 | Chemically strengthened glass substrate | Antiglare PET film | | 0.274 | 0.1083 | 0.48 | 1931 | 2A | 79 | Mo—Nb—O layer (20 nm) | SiO$_x$ (30 nm) | Mo—Nb—O layer (120 nm) | SiO$_x$ (88 nm) |
| Ex. 2 | Chemically strengthened glass substrate | Antiglare PET film | | 0.259 | 0.062 | 0.361 | 1703 | 2B | 60 | Mo—Nb—O layer (20 nm) | SiO$_x$ (30 nm) | Mo—Nb—O layer (120 nm) | SiO$_x$ (88 nm) |
| Ex. 3 | Chemically strengthened | Antiglare PET film | | 0.48 | 0.0278 | 0.241 | 707 | 2C | 57 | Mo—Nb—O layer (20 nm) | SiO$_x$ (30 nm) | Mo—Nb—O layer (120 nm) | SiO$_x$ (88 nm) |

TABLE 1-continued

| | Transparent substrate | | Diffusion layer | | | | | | | Anti-reflective film | | | |
| | Glass substrate | Resin substrate | Anti-glare layer | Sa (μm) | Sdr | Sdq | Spc (/mm) | FIG. | Haze value (%) | Dielectric layer (1) High refractive index layer | Dielectric layer (2) Low refractive index layer | Dielectric layer (3) High refractive index layer | Dielectric layer (4) Low refractive index layer |
|---|---|---|---|---|---|---|---|---|---|---|---|---|---|
| Ex. 4 | Chemically strengthened glass substrate | Antiglare PET film | | 0.248 | 0.0084 | 0.132 | 648 | 2D | 24 | Mo—Nb—O layer (20 nm) | SiO$_x$ (30 nm) | Mo—Nb—O layer (120 nm) | SiO$_x$ (88 nm) |
| Ex. 5 | Chemically strengthened glass substrate | Antiglare PET film | | 0.248 | 0.0084 | 0.132 | 648 | 2D | 24 | Mo—Nb—O layer (20 nm) | SiO$_x$ (30 nm) | Mo—Nb—O layer (120 nm) | SiO$_x$ (88 nm) |
| Ex. 6 | Chemically strengthened glass substrate | Antiglare PET film | | 0.248 | 0.0084 | 0.132 | 648 | 2D | 25 | Mo—Nb—O layer (20 nm) | SiO$_x$ (30 nm) | Mo—Nb—O layer (120 nm) | SiO$_x$ (88 nm) |
| Ex. 7 | Chemically strengthened glass substrate | Antiglare PET film | | 0.274 | 0.1083 | 0.48 | 1931 | 2A | 80 | Mo—Nb—O layer (20 nm) | SiO$_x$ (30 nm) | Mo—Nb—O layer (120 nm) | SiO$_x$ (88 nm) |
| Ex. 8 | Chemically strengthened glass substrate | Antiglare PET film | | 0.274 | 0.1083 | 0.48 | 1931 | 2A | 82 | Mo—Nb—O layer (20 nm) | SiO$_x$ (30 nm) | Mo—Nb—O layer (120 nm) | SiO$_x$ (88 nm) |
| Ex. 9 | Chemically strengthened glass substrate | Antiglare PET film | | 0.274 | 0.1083 | 0.48 | 1931 | 2A | 82 | Mo—Nb—O layer (20 nm) | SiO$_x$ (30 nm) | Mo—Nb—O layer (120 nm) | SiO$_x$ (88 nm) |
| Ex. 10 | Chemically strengthened glass substrate | Antiglare TAC film | | 0.083 | 0.0026 | 0.072 | 198 | 3A | 29 | Mo—Nb—O layer (20 nm) | SiO$_x$ (30 nm) | Mo—Nb—O layer (120 nm) | SiO$_x$ (88 nm) |
| Ex. 11 | Chemically strengthened glass substrate | Antiglare TAC film | | 0.0039 | 0.0005 | 0.03 | 96 | 3B | 3 | Mo—Nb—O layer (20 nm) | SiO$_x$ (30 nm) | Mo—Nb—O layer (120 nm) | SiO$_x$ (88 nm) |
| Ex. 12 | Chemically strengthened glass substrate | Antiglare PET film | | 0.178 | 0.0027 | 0.075 | 228 | 3C | 7 | Mo—Nb—O layer (20 nm) | SiO$_x$ (30 nm) | Mo—Nb—O layer (120 nm) | SiO$_x$ (88 nm) |
| Ex. 13 | Chemically strengthened glass substrate | Antiglare PET film | | 0.072 | 0.0012 | 0.049 | 121 | 3D | 2 | Mo—Nb—O layer (20 nm) | SiO$_x$ (30 nm) | Mo—Nb—O layer (120 nm) | SiO$_x$ (88 nm) |
| Ex. 14 | Chemically strengthened glass substrate | Antiglare PET film | | 0.248 | 0.0084 | 0.132 | 648 | 3D | 24 | TiO$_2$ (11 nm) | SiO$_x$ (35 nm) | TiO$_2$ (104 nm) | SiO$_x$ (86 nm) |
| Ex. 15 | Chemically strengthened glass substrate | Antiglare PET film | | 0.274 | 0.1083 | 0.48 | 1931 | 3A | 84 | TiO$_2$ (11 nm) | SiO$_x$ (35 nm) | TiO$_2$ (104 nm) | SiO$_x$ (86 nm) |

TABLE 2

| | | | SCI | | SCE | | | |
| | Luminous transmittance Y (%) | Transmission color b* | Luminous reflectance SCI Y (%) | Lightness of all reflection light SCI L* | Diffuse reflectance SCE Y (%) | Lightness of diffuse reflection light SCE L* | (SCE Y)/ (SCI Y) | Sheet resistivity (Ω/square) |
|---|---|---|---|---|---|---|---|---|
| Ex. 1 | 77 | 1.2 | 0.74 | 6.70 | 0.67 | 6.00 | 0.91 | $1 \times 10^{10}$ |
| Ex. 2 | 76 | 1.4 | 0.62 | 5.60 | 0.46 | 4.10 | 0.74 | $1 \times 10^{10}$ |
| Ex. 3 | 73 | 1.9 | 0.51 | 4.60 | 0.34 | 3.10 | 0.67 | $1 \times 10^{10}$ |

TABLE 2-continued

| | Luminous transmittance Y (%) | Transmission color b* | SCI | | | SCE | | |
| | | | Luminous reflectance SCI Y (%) | Lightness of all reflection light SCI L* | Diffuse reflectance SCE Y(%) | Lightness of diffuse reflection light SCE L* | (SCE Y)/ (SCI Y) | Sheet resistivity (Ω/square) |
|---|---|---|---|---|---|---|---|---|
| Ex. 4 | 86 | 1.3 | 0.89 | 8.06 | 0.28 | 2.54 | 0.31 | $1 \times 10^{10}$ |
| Ex. 5 | 69 | −1.1 | 0.52 | 4.70 | 0.16 | 1.41 | 0.31 | $1 \times 10^{10}$ |
| Ex. 6 | 48 | 1.3 | 0.34 | 3.09 | 0.13 | 1.17 | 0.38 | $1 \times 10^{10}$ |
| Ex, 7 | 85 | 1.1 | 0.61 | 5.48 | 0.58 | 5.25 | 0.95 | $1 \times 10^{10}$ |
| Ex. 8 | 72 | −1.1 | 0.53 | 4.82 | 0.52 | 4.65 | 0.98 | $1 \times 10^{10}$ |
| Ex. 9 | 53 | 0.7 | 0.37 | 3.38 | 0.37 | 3.34 | 1.00 | $1 \times 10^{10}$ |
| Ex. 10 | 70 | −1.1 | 0.31 | 2.80 | 0.06 | 0.50 | 0.19 | $1 \times 10^{10}$ |
| Ex. 11 | 71 | 2.5 | 0.21 | 1.90 | 0.02 | 0.20 | 0.10 | $1 \times 10^{10}$ |
| Ex. 12 | 49 | 1.7 | 0.25 | 2.26 | 0.03 | 0.28 | 0.12 | $1 \times 10^{10}$ |
| Ex. 13 | 50 | 1.5 | 0.26 | 2.32 | 0.02 | 0.15 | 0.08 | $1 \times 10^{10}$ |
| Ex. 14 | 94 | 0.4 | 1.03 | 9.28 | 0.33 | 2.98 | 0.32 | $1 \times 10^{10}$ |
| Ex. 15 | 93 | 0.4 | 1.62 | 13.37 | 1.60 | 13.25 | 0.99 | $1 \times 10^{10}$ |

As seen from Table 2, in the anti-reflective film-attached transparent substrates of Examples 1 to 10, the luminous reflectance (SCI Y) was 1% or lower and the ratio (SCE Y)/(SCI Y) was 0.15 or higher. Thus, each of them is high in the effect of preventing glare due to external light reflection when used as a cover glass of an image display device. Further, when the image of the reflected structure or other objects were visually checked, the image contours were blurred and the reflection was not noticeable.

On the other hand, in the anti-reflective film-attached transparent substrates of Examples 11 to 13, the ratio (SCE Y)/(SCI Y) was lower than 0.15. In the anti-reflective film-attached transparent substrates of Examples 14 and 15, the luminous reflectance (SCI Y) was higher than 1%. Thus, each of them is low in the effect of preventing glare due to external light reflection when used as a cover glass of an image display device. Further, when the image of the reflected structure and other object were visually checked, the image contours were clear and the reflection was noticeable.

All of Examples 1 to 15 had anti-reflective films formed by sputtering and vacuum deposition. In the scratch resistance test, all of Examples 1 to 15 did not contain scratches, whereas scratches were visually confirmed in the control example where the antiglare layer was the outermost surface without an anti-reflective film. It was confirmed that the surface abrasion resistance was improved by the antireflection film formed in vacuum.

DESCRIPTION OF SYMBOLS

10: Transparent substrate
30: Anti-reflective film
31: Diffusion layer
32: First dielectric layer
34: Second dielectric layer

The invention claimed is:

1. An anti-reflective film-attached transparent substrate, comprising:
a transparent substrate;
a diffusion layer formed on a surface of the transparent substrate; and
an anti-reflective film formed on the diffusion layer and having a lamination structure comprising a plurality of dielectric layers having different refractive indices, wherein the anti-reflective film-attached transparent substrate has an outermost surface having a luminous reflectance SCI Y of 1% or lower and a ratio of a diffuse reflectance SCE Y to the luminous reflectance SCI Y of 0.15 or higher, and
wherein a laminate of the transparent substrate and the diffusion layer has a haze value of 29% or larger.

2. The anti-reflective film-attached transparent substrate according to claim 1, wherein a laminate of the transparent substrate and the diffusion layer has a haze value of from 29% to 90%.

3. The anti-reflective film-attached transparent substrate according to claim 2, wherein the anti-reflective film-attached transparent substrate has a luminous transmittance Y of 20% to 90%.

4. The anti-reflective film-attached transparent substrate according to claim 2, wherein the anti-reflective film has a sheet resistivity of $10^4$ Ω/square or higher.

5. The anti-reflective film-attached transparent substrate according to claim 2, wherein the anti-reflective film-attached transparent substrate has a b* value of a transmission color with a D65 light source of 5 or smaller.

6. The anti-reflective film-attached transparent substrate according to claim 2, wherein at least one layer of the dielectric layers is mainly formed of an oxide of Si,
at least another layer in layers of the laminated structure is mainly formed of a mixed oxide of an oxide comprising at least one element selected from the group A consisting of Mo and W and an oxide comprising at least one element selected from the group B consisting of Si, Nb, Ti, Zr, Ta, Al, Sn, and In, and
a content of the elements of the group B in the mixed oxide is 65 mass % or lower with respect to a total of the elements of the group A in the mixed oxide and the elements of the group B in the mixed oxide.

7. The anti-reflective film-attached transparent substrate according to claim 2, further comprising:
an antifouling film on the anti-reflective film.

8. The anti-reflective film-attached transparent substrate according to claim 2, wherein the transparent substrate comprises a glass.

9. The anti-reflective film-attached transparent substrate according to claim 1, wherein the anti-reflective film-attached transparent substrate has a luminous transmittance Y of 20% to 90%.

10. The anti-reflective film-attached transparent substrate according to claim 1, wherein the anti-reflective film has a sheet resistivity of $10^4$ $\Omega$/square or higher.

11. The anti-reflective film-attached transparent substrate according to claim 1, wherein the anti-reflective film-attached transparent substrate has a b* value of a transmission color with a D65 light source of 5 or smaller.

12. The anti-reflective film-attached transparent substrate according to claim 1, wherein at least one layer of the dielectric layers is mainly formed of an oxide of Si, at least another layer in layers of the laminated structure is mainly formed of a mixed oxide of an oxide comprising at least one element selected from the group A consisting of Mo and W and an oxide comprising at least one element selected from the group B consisting of Si, Nb, Ti, Zr, Ta, Al, Sn, and In, and a content of the elements of the group B in the mixed oxide is 65 mass % or lower with respect to a total of the elements of the group A in the mixed oxide and the elements of the group B in the mixed oxide.

13. The anti-reflective film-attached transparent substrate according to claim 1, further comprising:

an antifouling film on the anti-reflective film.

14. The anti-reflective film-attached transparent substrate according to claim 1, wherein the transparent substrate comprises a glass.

15. The anti-reflective film-attached transparent substrate according to claim 14, wherein the glass is chemically strengthened.

16. The anti-reflective film-attached transparent substrate according to claim 1, wherein the transparent substrate comprises at least one resin selected from polyethylene terephthalate, polycarbonate, acrylic, silicone, and triacetyl cellulose.

17. The anti-reflective film-attached transparent substrate according to claim 1, wherein the transparent substrate is a laminate of a glass and at least one resin selected from polyethylene terephthalate, polycarbonate, acrylic, silicone, and triacetyl cellulose.

18. The anti-reflective film-attached transparent substrate according to claim 1, wherein the surface of the transparent substrate on a side where the anti-reflective film is formed is subjected to an antiglare treatment.

19. An image display device, comprising:

the anti-reflective film-attached transparent substrate of claim 1.

20. The anti-reflective film-attached transparent substrate according to claim 1, wherein a laminate of the transparent substrate and the diffusion layer has a haze value of 50% or larger.

* * * * *